United States Patent
Lehane et al.

(10) Patent No.: US 9,516,449 B2
(45) Date of Patent: *Dec. 6, 2016

(54) SYSTEM AND METHOD FOR CONTROLLING ADVANCED TRIGGERING OPERATIONS IN A TELECOMMUNICATION NETWORK

(71) Applicant: OPENET TELECOM LTD., Dublin (IE)

(72) Inventors: Bart Lehane, Dublin (IE); Alan McNamee, Dublin (IE); Cameron Ross Dunne, Kildare (IE); Andrew D'Souza, Silver Spring, MD (US)

(73) Assignee: Openet Telecom LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,361

(22) Filed: Aug. 1, 2013

(65) Prior Publication Data

US 2014/0038549 A1    Feb. 6, 2014

Related U.S. Application Data

(60) Provisional application No. 61/678,711, filed on Aug. 2, 2012.

(51) Int. Cl.
| | |
|---|---|
| *H04W 4/24* | (2009.01) |
| *H04W 12/02* | (2009.01) |
| *H04W 24/02* | (2009.01) |
| *H04W 4/00* | (2009.01) |

(Continued)

(52) U.S. Cl.
CPC ............... *H04W 4/005* (2013.01); *H04W 4/24* (2013.01); *H04W 12/02* (2013.01); *H04W 12/08* (2013.01); *H04W 24/02* (2013.01); *H04M 15/24* (2013.01)

(58) Field of Classification Search
None
See application file for complete search history.

(56) References Cited

U.S. PATENT DOCUMENTS

| | | | |
|---|---|---|---|
| 2004/0215824 A1* | 10/2004 | Payrits | 709/245 |
| 2010/0057485 A1* | 3/2010 | Luft | 705/1 |

(Continued)

FOREIGN PATENT DOCUMENTS

| | | |
|---|---|---|
| EP | 2096884 A1 | 9/2009 |
| EP | 2395811 A1 | 12/2011 |

(Continued)

OTHER PUBLICATIONS

3GPP TR 23.888, Technical Report, 3rd Generation Partnership Project; Technical Specification Group Services and System Aspects; System Improvements for Machine-Type Communications (Release 11), V1.4.0, Aug. 2011.

(Continued)

*Primary Examiner* — Lester Kincaid
*Assistant Examiner* — Daniel G Bassett
(74) *Attorney, Agent, or Firm* — The Marbury Law Group PLLC

(57) ABSTRACT

A network server may be configured to communicate triggers across a telecommunication network by receiving a trigger communication message that includes information suitable for causing a destination machine-to-machine device to perform operations in response to receiving the trigger communication message, receiving policy or charging information from a component in the telecommunication network, determining whether the trigger communication message should be sent to the destination machine-to-machine based on the received policy or charging information, and sending the trigger communication message to the destination component only when it is determined that the trigger communication message should be sent to the destination machine-to-machine based on the received policy or charging information.

19 Claims, 8 Drawing Sheets

(51) Int. Cl.
*H04W 12/08* (2009.01)
*H04M 15/24* (2006.01)

(56) References Cited

U.S. PATENT DOCUMENTS

| | | | |
|---|---|---|---|
| 2011/0199905 A1 | 8/2011 | Pinheiro et al. | |
| 2012/0164954 A1 | 6/2012 | Karampatsis et al. | |
| 2012/0202508 A1* | 8/2012 | Toth | H04W 4/00 455/450 |
| 2013/0114408 A1* | 5/2013 | Sastry et al. | 370/231 |
| 2013/0227138 A1* | 8/2013 | Cai et al. | 709/225 |
| 2013/0288732 A1* | 10/2013 | Beale | 455/509 |
| 2014/0219182 A1* | 8/2014 | Chandramouli et al. | 370/328 |

FOREIGN PATENT DOCUMENTS

| | | |
|---|---|---|
| WO | 2011006768 A1 | 1/2011 |
| WO | 2011095618 A1 | 8/2011 |
| WO | 2011134329 A1 | 11/2011 |

OTHER PUBLICATIONS

European Search Report, EP Application No. 13179192, Feb. 10, 2014.
European Search Report, EP Application No. 13179193, Feb. 10, 2014.
European Search Report, EP Application No. 13179194, Feb. 10, 2014.
Huawei, 'Network Improvement for Group Based Charging', 3GPP TSG SA WG2 Meeting #78, Feb. 22-26, 2010, San Francisco, USA.
Juniper Networks, 'Solution for Group based Charging/policing/addressing', SA WG2 Meeting #91, May 21-25, 2012, Kyoto Japan.
MediaTek Inc., 'MTC small data Identification mechanism for non-SMS Small Data Transmission Solution', SA WG2 Meeting #87, Oct. 10-14, 2011, Jeju Island, South Korea.
ZTE, 'Transmission of Small IP Packets', 3GPP SA WG2 Meeting #92, Jul. 9-13, 2012, Barcelona Spain.

* cited by examiner

SYSTEM AND METHOD FOR CONTROLLING ADVANCED TRIGGERING OPERATIONS IN A TELECOMMUNICATION NETWORK

RELATED APPLICATIONS

This application claims the benefit of priority to U.S. Provisional Application No. 61/678,711, titled "System and Method for Providing Machine-To-Machine Engagements with Cellular Wireless Networks" filed Aug. 2, 2012. This application is also related to U.S. patent application Ser. No. 13/956,828 titled "System and Method for Providing Detection of Signaling-Only Engagements in a Telecommunication Network" filed concurrently with this application, and U.S. patent application Ser. No. 13/957,346 titled "System and Method for Controlling Advanced Triggering Operations in a Telecommunication Network" filed concurrently with this application, both of which also claim the benefit of priority to U.S. Provisional Application No. 61/678,711, and the entire contents of all of which are hereby incorporated by reference.

BACKGROUND

Telecommunications networks have seen very rapid advances in their numbers of users and the types of services available. In particular, the combination of data-orientated mobile telecommunications networks (e.g., 3G, 4G, LTE, Wi-Fi, etc.) and feature rich smart phones and tablet devices has enabled users to consume a greater variety of services. As more users utilize these services, telecommunication system operator networks must expand to meet the increase in user demand, support the array of new services and provide fast, reliable communications. This expansion has greatly increased the complexity of wireless and cellular networks, and the efficient management of network traffic is becoming an ever more challenging task.

Another recent development within the computing and telecommunications industries has been the proliferation of mobile devices that are capable of performing Machine-to-Machine (M2M) communications. Such devices may communicate and interact with other devices to accomplish a variety of tasks, all without any direct involvement of human users or operators. Yet, unlike conventional M2M devices, mobile M2M capable devices are not always tethered to the network via physical connection. Rather, these devices may communicate using wireless or the cellular telephone networks, such as 3G, 4G, LTE and UMTS networks.

As M2M capable devices continue to grow in popularity and use, telecommunication network providers must develop improved solutions for managing the increases in network traffic caused by the use of such devices. Therefore, improved solutions for managing triggers and signaling traffic to ensuring efficient traffic flow, reduce network congestion, and allow for the proper compensation of the telecommunication network operators/providers for the use of their networks by M2M devices will be beneficial to consumer and telecommunication network operators.

SUMMARY

The various embodiments include methods of communicating triggers in a telecommunication network, which may include receiving in a processor a trigger communication message from a source device, the trigger communication message including information suitable for causing a destination device to automatically initiate an operation, receiving policy information from a component in the telecommunication network, determining whether the trigger communication message should be sent to the destination device based on the received policy information, sending the trigger communication message to the destination device only when it is determined from the received policy information that the trigger communication message should be sent to the destination device.

In an embodiment, receiving policy information from the component in the telecommunication network includes receiving charging information via a charging based interface. In a further embodiment, receiving policy information from the component in the telecommunication network includes receiving policy information from a policy control rules function (PCRF) component via a policy based interface. In a further embodiment, receiving policy information from the component in the telecommunication network includes receiving network congestion information.

In a further embodiment, the method may include determining based on the received policy information a time period during which the trigger communication message should be transmitted to the destination device to reduce network congestion, and determining whether the trigger communication message should be sent to the destination device based on the received policy information includes determining whether a current time is within the time period.

In a further embodiment, the method may include determining a time period during which the trigger communication message should be transmitted to the destination device to reduce an amount billed to a charging account associated with the source device, and determining whether the trigger communication message should be sent to the destination device based on the received policy information includes determining whether a current time is within the time period. In a further embodiment, determining whether the trigger communication message should be sent to the destination device based on the received policy information includes determining whether the trigger communication message should be sent to the destination device based on resource validation information received from a policy component in the telecommunication network.

In a further embodiment, the method may include determining a criterion for sending the trigger communication message to the destination device based on the received policy information when it is determined that the trigger communication message should be sent to the destination device, and monitoring conditions to determine whether the determined criterion has been satisfied, in which sending the trigger communication message to the destination device includes sending the trigger communication message to the destination device when it is determined that the criterion has been satisfied.

In a further embodiment, determining the criterion for sending the trigger communication message to the destination device includes scheduling the trigger communication message for transmission at a future time, and monitoring conditions to determine whether the determined criterion has been satisfied includes determining if a current time is equal to the future time at which the trigger communication message is scheduled for transmission.

In a further embodiment, the method may include determining whether the trigger communication message includes a pseudonym identity value, using the pseudonym identity value included in the trigger communication message to retrieve a hardware-based identity value from memory when it is determined that the trigger communication message includes a pseudonym identity, and updating the trigger communication message by replacing the pseudonym identity value with the retrieved hardware-based identity value, in which sending the trigger communication message to the destination device includes sending the updated trigger communication message to the destination device.

In a further embodiment, the method may include receiving a response communication message that includes a hardware-based identity value from the destination device in response to sending the trigger communication message to the destination device, determining whether a pseudonym identity should be used for the received response communication message, generating a pseudonym identity value when it is determined that a pseudonym identity should be used for the response communication message, storing the generated pseudonym identity value in memory in association with the hardware-based identity value included the response communication message, updating the response communication message by replacing the hardware-based identity value with the generated pseudonym identity value, and sending the response communication message to the source device.

Further embodiments include a server computing device having a processor configured with processor-executable instructions to perform various operations corresponding to the methods discussed above.

Further embodiments include a non-transitory processor-readable storage medium having stored thereon processor-executable instructions configured to cause a processor to perform various operations corresponding to the method operations discussed above

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
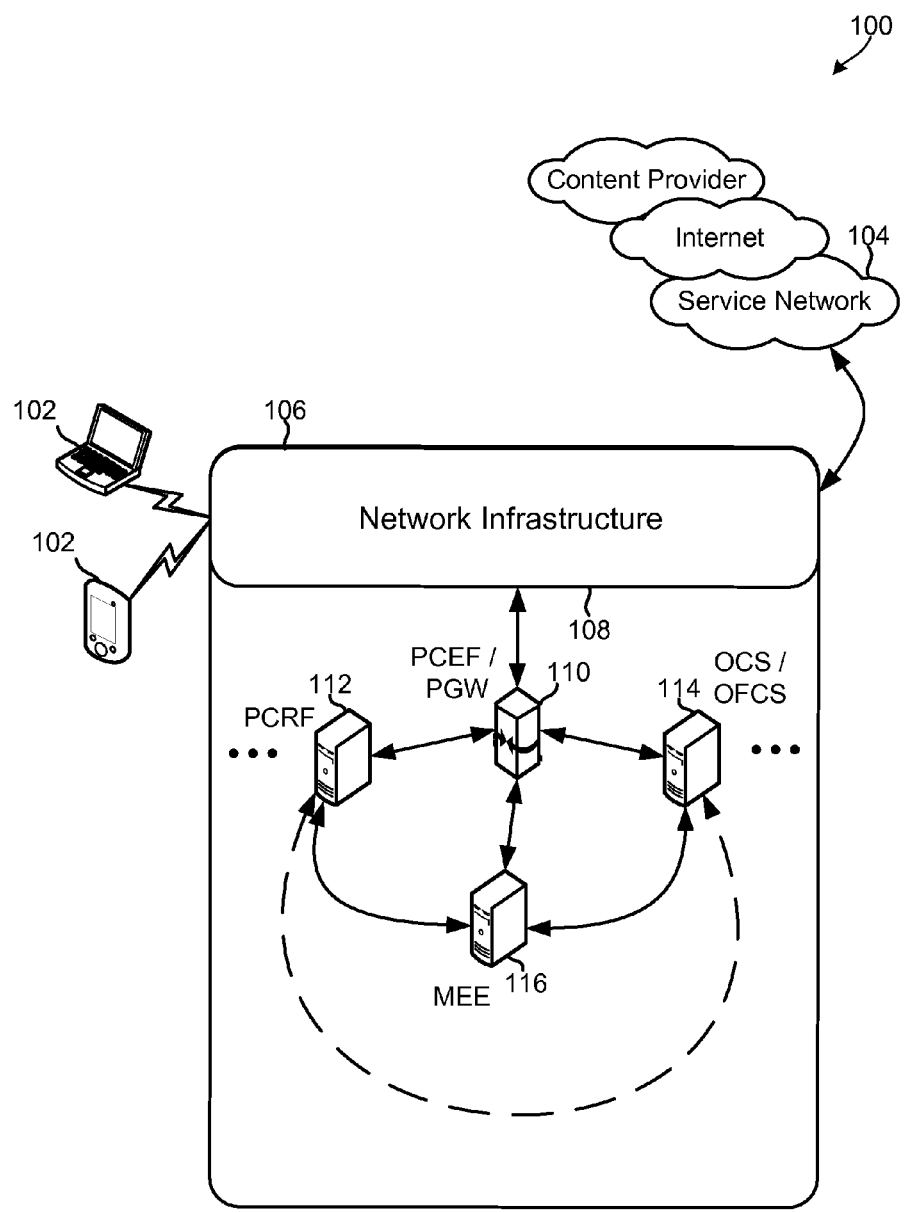
FIG. 1 is a system block diagram illustrating network components of a communication system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a single process and/or thread of execution. A component may be localized on one processor or core, or distributed between two or more processors or cores. In addition, components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, European Telecommunications Standards Institute (ETSI) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The term "user equipment (UE)" is used herein to refer to any electronic device capable of sending and receiving wireless communication signals. A user equipment device typically includes a programmable processor, a memory, and communication circuitry suitable for sending and receiving information to and from a cellular telephone communications network.

The term "signaling communication" is used herein to refer to the transmission and/or reception of information via the control plane. The term "content communication" is used herein to refer to the transmission and/or reception of information via the data or user plane. A signaling communication is typically used to communicate information relating to communication setup, session establishment, security, authentication, charging, enforcement of policy rules, etc. A content communication is typically used to communicate payload information, such as voice or data.

In recent years, there has been an increase in the popularity and use of machine-to-machine (herein "M2M") user equipment devices. M2M devices may be user equipment devices or network components that communicate and interact with other M2M devices to accomplish a task without the direct involvement of human users or operators. These devices often communicate via wireless or the cellular telephone communications networks, and thus create new challenges for telecommunication service providers and network operators (herein collectively "network operator").

As the popularity and use of M2M devices continues to increase, triggers and signaling communications are expected to consume a significant amount of the network's available bandwidth and cause network congestion. A trigger may be a communication signal or message that includes information suitable for causing a receiving device or component to initiate an action or perform an operation in response to receiving the communication signal/message. For example, a trigger may include information suitable for causing a user equipment device to "wake up" so that voice or data communications with that device may commence.

M2M devices typically communicate a large number of triggers across the network, which may result in a significant increase in network traffic and/or place additional demands on the network as the use of M2M proliferates without generating additional revenue for the network operator. Further, to meet the increases in usage and demand, network operators may be required to update their networks and/or the policies by which M2M devices are allowed to access and use their networks/services. Yet, using conventional solutions, this requires that the network operators make significant centralized changes to their network infrastructures. Such significant and/or centralized changes may impose a significant cost burden on the network operators.

The various embodiments provide intelligent, efficient and cost effective solutions for managing the network traffic caused by trigger and signaling communications of M2M devices. The various embodiments include network components configured to allow network operators to better manage the unique traffic characteristics of M2M devices and their communications, ensure efficient traffic flow, and avoid excessive network congestion from triggers and/or signaling communications generated by M2M devices, all without requiring significant modifications to the existing network infrastructure of the operator networks.

Various embodiments may include components configured to generate, modify, augment, communicate, and/or manage the triggers and signaling communications so that they may be processed and communicated in a more intelligent, efficient, and/or cost effective manner than that which is available via conventional solutions. The network component may also be configured to allow network operators to implement a wide array of subscription or billing plans for the triggers and signalling communications of M2M devices, thereby allowing network operators to better meet their customers' usage needs while increasing revenue, reducing network traffic and congestion, and improving the performance of the network.

Generally, M2M communications are performed between two or more M2M devices (e.g., an M2M application server and an M2M user equipment device). These M2M communications may include trigger communication messages that include information suitable for causing a receiving M2M device to "wake up," connect to the network, receive information, send information another M2M device, or perform other similar operations. However, M2M devices typically communicate via a wireless telecommunication network and not direct communication links. As a result, one or more of the components in the telecommunications network must receive, process, and/or route the trigger communication messages to and from the M2M devices. In existing wireless telecommunication networks, these operations are performed without taking into consideration the network's state, congestion, balance information, relative priority of the trigger, time of day, or other intelligent factors or network conditions. As a result, existing wireless telecommunication networks are not configured for efficiently or intelligently managing the additional network traffic that will result from the increase in the number and use of the M2M devices.

Various embodiments include components configured to take into consideration any or all such factors when generating, processing, managing, transmitting, forwarding, and/or routing trigger communication messages. For example, a network component may be configured to communicate with various components/nodes in the network to receive information suitable for intelligently determining a time period during which a trigger communication message should be transmitted to a destination M2M device so as to accomplish the function of the trigger while reducing network congestion and improving the performance of the network. The network component may also be configured to intelligently communicate the trigger communication message so as to ensure that the network, M2M user equipment devices, and/or M2M application servers all receive a level of service that is commensurate with their operating, usage or load requirements.

In an embodiment, the network component may be an M2M engagement engine (MEE) component. In various embodiments, the MEE component may be configured to request and receive information from a policy management system, a subscriber database, a charging system, or any other similar node/component in the network. In various embodiments, the MEE component may be configured to use information received from a policy management system and/or a charging system to determine whether a trigger communication message should be communicated to a M2M device based on the network's state or congestion level, the subscriber's balance information, the relative priority of the trigger, time of day, and/or other similar factors. In an embodiment, the MEE component may be configured to send the trigger communication message using signaling communication technologies, protocols, or channels. In another embodiment, the MEE component may be configured to send a trigger communication message using data or content communication technologies, protocols, or channels.

In an embodiment, the MEE component may be configured to augment a trigger communication message to include additional information, such as trigger parameters, that may be used by other components in the operator network to intelligently determine the criteria that should be met before the trigger communication message is sent to the destination M2M device. The criteria may be used to determine when (or under what network operating conditions) the trigger communication message should be sent so that the trigger accomplishes its intended functionality, the subscribers receive the most cost effective rate, network congestion is reduced, and/or performance of the network is improved.

The various embodiments may be implemented within a variety of communication systems, an example of which is illustrated in FIG. 1. A typical communication system 100 includes user equipment 102 devices configured to send and receive voice, data, and control signals to and from a service network 104 (and ultimately the Internet and/or a content provider) via a communications network 106. The user equipment 102 devices may be M2M user equipment devices configured communicate and interact with M2M network components (e.g., M2M application server) to accomplish a task without the direct involvement of human users or operators.

In the example illustrated in FIG. 1, the communications network 106 includes a network infrastructure 108 unit that encapsulates various network components or systems, each of which may implement any of a variety of communication technologies/protocols to process and route the voice, data and control signals to and from the user equipment 102. For example, the network infrastructure 108 unit may include components for implementing a cellular telephone network, a radio access network (e.g., UTRAN, RAN, etc.), WiFi network, WiMAX network, and/or other well known communication technologies (e.g., GPRS, UMTS, LTE, cdma-One, CDMA2000™). Since these structures are well known, certain details have been omitted in order to focus the descriptions on the most relevant features.

The network infrastructure 108 unit may include connections to a policy control enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules.

The PCEF component 110 may also be configured to send signaling information (e.g., control plane information relating to communication setup, security, authentication, charging, enforcement of policy rules, etc.) to a policy control rules function (PCRF) component 112, online/offline charging system (OCS/OFCS) components 114, a M2M engagement engine (MEE) component 116, and other similar components that participate in, collect information from, or otherwise contribute to, communications between the service network 104 and the user equipment 102.

The MEE component 116 may be configured to communicate with the PCRF component 112, the OCS/OFCS component 114, and/or other similar components to receive information regarding current or predicted future network states, network traffic volumes, network congestion, traffic metering, subscriber profiles, policy rules, priorities, balance information, etc. The MEE component 116 may receive and use such information to determine whether a signaling or trigger communication message should be sent to a user equipment 102 device. The MEE component 116 may also use this information to determine a time period during which a signaling or trigger communication message should be sent to a user equipment 102 device to reduce network congestion while providing the user equipment 102 device with a satisfactory level of service.

The components 110, 112, 114, 116 may communicate using a standardized protocol, such as the Diameter protocol, remote authentication dial in user service (RADIUS) protocol, or any other protocol. For example, in an embodiment, the components 110, 112, 114, 116 may be configured to communicate via the Diameter protocol, which is an extensible protocol that provides a general mechanism for two or more components/nodes in a network to communicate signaling information (e.g., communications involving call setup, security, authentication, charging, enforcement of policy rules). In various embodiments, any or all of the components 110, 112, 114, 116 may include direct or indirect communication links (not illustrated) to the Internet or "the cloud."

Figure 2:
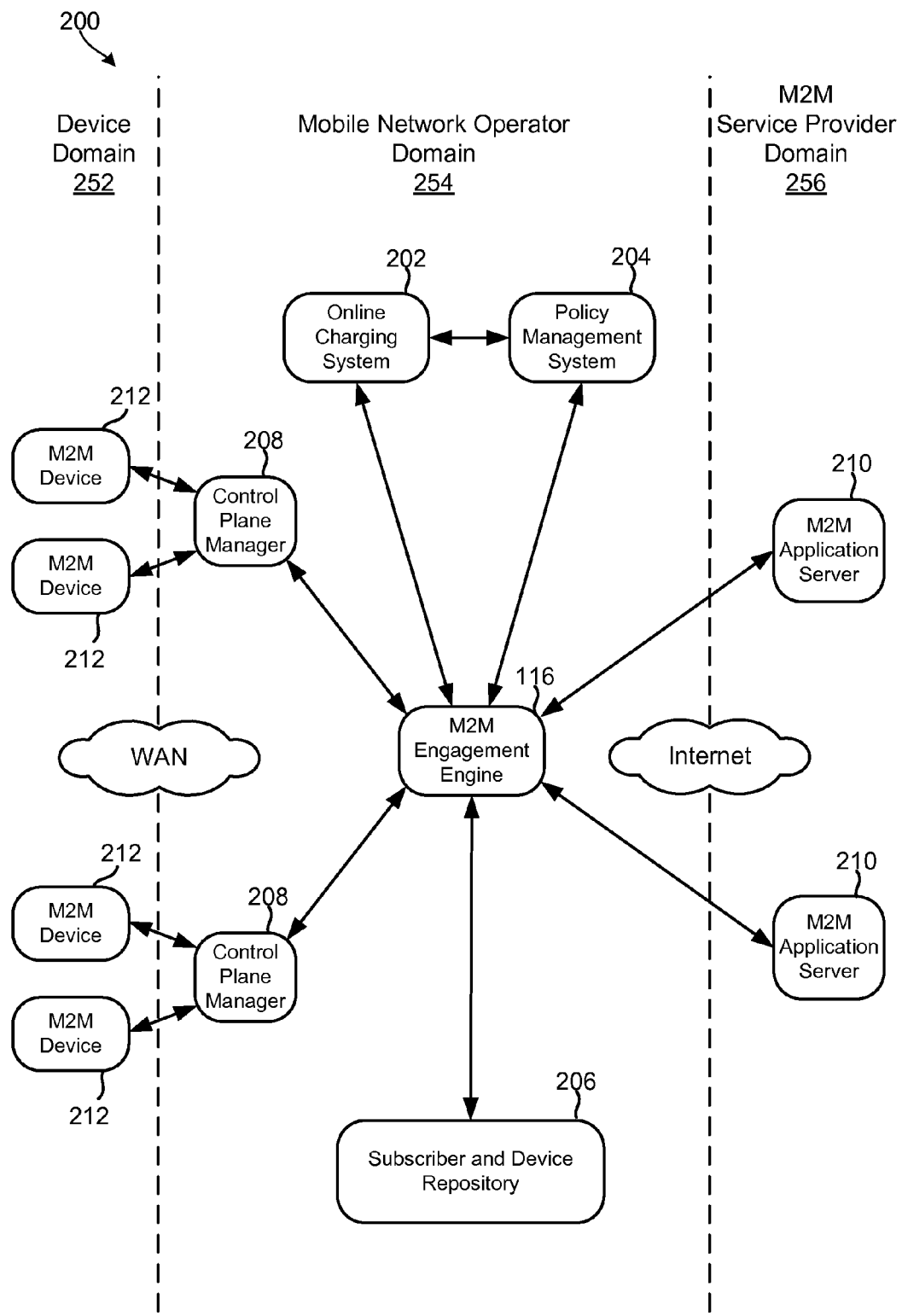
FIG. 2 is a system block diagram illustrating communication links and information flows between various logical and functional components in a communication system suitable for implementing the various embodiments.

FIG. 2 illustrates information flows between various logical and functional components in a communication system 200 suitable for implementing the various embodiments. The communication system 200 may be organized into a device domain 252, a mobile network operator domain 254, and a M2M service provider domain 256. The device domain 252 may include a plurality of M2M user equipment devices 212 configured to communicate with a control plane manager component 208, which may be accomplished via a wide area network (WAN) or cellular communication links. The M2M service provider domain 256 may include a plurality of M2M application servers 210 configured to communicate with the MEE component 204, which may be accomplished via direct communication links or via the Internet or the "cloud."

The mobile network operator domain 254 may include an MEE component 116, an online charging system (OCS) component 202, a policy management system (PMS) component 204, subscriber and device repository component 206, and a control plane manager component 208, any or all of which may be owned or controlled by the network operator.

The mobile network operator domain 254 may include two or more control plane manager components 208 that use different communication methods, technologies, standards, and/or protocols to communicate with the M2M devices 212. Further, each control plane manager component 208 may include any or all of a Short Message Service-Service Centre (SMS-SC), Mobile Switching Centre (MSC), Mobility Management Entity (MME), Serving GPRS support node (SGSN), Gateway, PCEF component, or any other similar component suitable for controlling the characteristics of the communications between an M2M device 212 and another component in the system 200.

The subscriber and device repository component 206 may include a memory or a storage system that stores static (or relatively static) information regarding subscribers and/or M2M user equipment devices 212. In an embodiment, the subscriber and device repository component 206 may include a subscriber profile repository (SPR).

The PMS component 204 may be configured to generate and/or enforce policy rules to control the bandwidth, the quality of service (QoS), and other characteristics of communications to and from the M2M devices 212. In an embodiment, the PMS component 204 may include a PCRF component 112.

The OCS component 202 may be configured to send and/or receive charging information relating to a subscriber and/or an M2M device 212 to and/or from the other components in the network 200, such as to and from the MEE and PMS components 116, 204. In an embodiment, the online charging system component 202 may be included in an OCS/OFCS component 114, which is discussed above with reference to FIG. 1.

The MEE component 116 may be configured to provide a combination of the functionalities typically provided in 3GPP network by a Services Capability Server (SCS) and a Machine Type Communications-Interworking Function (MTC-IWF) server. The MEE component 116 may also be configured to provide the functionally typically provided in an ETSI network by a Service Capability Layer (SCL) component. In addition to these functionalities, the MEE component 116 may be configured to perform advanced triggering operations, which may include sending and/or receiving information to and from any or all of the components 202, 204, 206, 208 in the mobile network operator domain 254. The MEE component 116 may also be configured communicate with one or more M2M application servers 210 in the M2M service provider domain 256.

In an embodiment, the MEE component 116 may be configured to operate as an intermediary component or interface between an M2M application server 210 and an M2M device 212. For example, the MEE component 116 may be configured to receive a trigger communication message from an M2M application server 210, determine the type of radio access network to which a destination M2M device 212 is attached, select an appropriate control plane manager component 208 based on the radio access network type, request and receive information from various components in the network 200, generate signaling information based on the trigger communication message and information received from the components in the network 200, and send the generated signaling information to the selected control plane manager component 208 for forwarding to the destination M2M device 212.

In an embodiment, the MEE component 116 may be configured to augment a trigger communication message received from an M2M application server 210, which may be accomplished by adding information to the received trigger communication message. For example, the MEE component 116 may be configured to add trigger parameters and/or generated/received signaling information to the trigger communication message, and send this augmented trigger communication message to the selected control plane manager component 208 for forwarding to an M2M device 212. The MEE component 116 may be configured to send the generated signaling information and/or trigger communication message to the control plane manager component 208 via the control plane (e.g., in a signaling message, etc.) or the data plane (e.g., in a content message, such as an SMS).

Each control plane manager component 208 may be configured to receive signaling information and/or a trigger communication message from the MEE component 116, perform various operations to identify and select the destination M2M device 212, and send the signaling information and/or trigger communication message to the selected M2M device 212. A control plane manager component 208 may send this information/message to the selected M2M device 212 in a signaling message (e.g., via the control plane) or in a content message (e.g., via the data plane).

The M2M device 212 may be configured to perform various operations in response to receiving signaling information and/or trigger communication messages from the control plane manager component 208. For example, in response to receiving a trigger communication message, the M2M device 212 may establish/open a connection (e.g., a data plane connection) to the M2M application server 210 so that the M2M device 212 and M2M application server 210 may exchange/communicate application level information.

As mentioned above, the MEE component 116 may be configured to interact with the various components within the M2M device domain 252, mobile network operator domain 254 and M2M service provider domain 256. Interactions between the MEE component 116 and the components in the M2M device domain 252 and the M2M service provider domain 256 may be accomplished via networks (e.g., WAN or the Internet) and/or through defined ports or URLs. In an embodiment, the MEE component 116 may be configured to operate as a firewall between the components in the mobile network operator domain 254 and the devices/components in the other domains 252, 256.

In the various embodiments, the MEE component 116 may be configured to interface with the device domain 252 through Internet protocol (e.g., HTTP, SOAP, TLS, etc.) or legacy communication links, such as simple message service (SMS), and interface with the M2M service provider domain 256 via Internet protocol (e.g., HTTP, SOAP, TLS, etc.). In various embodiments, the MEE component 116 may be configured to communicate with the PMS component 204 and with the OCS component 202. The MEE component 116 may also be configured to communicate with the off-line charging system components, which may be accomplished using the Ga and Rf message interfaces. The MEE component 116 may be further configured to communicate with various components in an authorization, authentication and access control (AAA) domain to provide M2M security bootstrapping via RADIUS or Diameter communication technologies.

In an embodiment, the MEE component 116 may be configured to allow an M2M service provider to manage or control some or all of the operations/features of the MEE component 116. This may include the management of the number of M2M devices, the amount of storage consumed within the MEE component 116, the number of processors required within the MEE component 116, and the amount of memory consumed by the MEE component 116.

Figure 3:
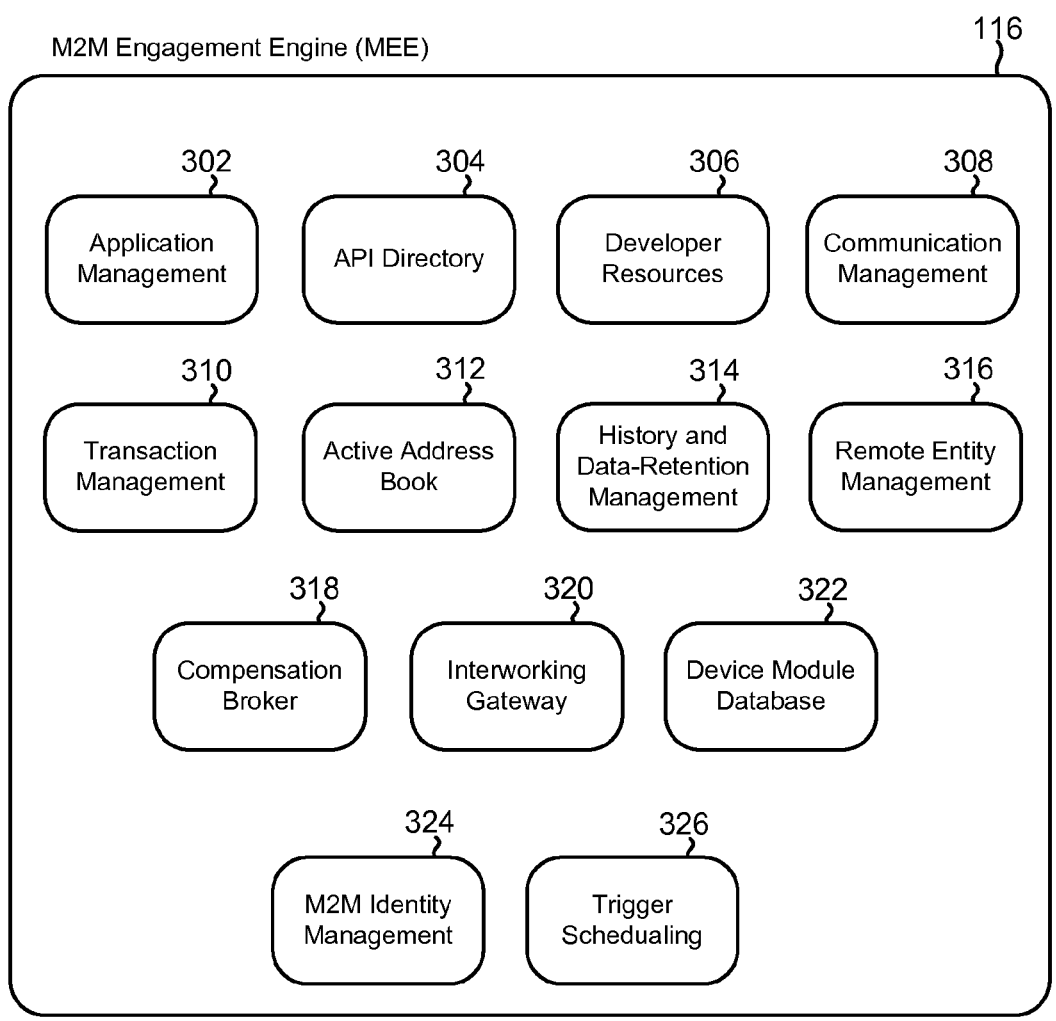
FIG. 3 is a block diagram illustrating example functional components, software modules, and application programming interfaces (APIs) in an embodiment network component that may be configured to perform advanced triggering operations in accordance with the various embodiments.

FIG. 3 illustrates example functional components, software modules, and application programming interfaces (APIs) of an embodiment MEE 116 component that may be configured to perform advanced triggering operations to manage the triggers and signaling communications between an M2M device 212 and a M2M application server 210. In the example illustrated in FIG. 3, the MEE component 116 includes an application management module 302, an API directory module 304, developer resource module 306, communication management module 308, transaction management module 310, an active address book module 312, a history and data-retention management module 314, a remote entity management module 316, compensation broker module 318, interworking gateway module 320, a device module database 322, an M2M identity management module 324, and a trigger scheduling module 326.

The application management module 302 may be configured to perform various operations to manage application lifecycles, and to support enablement and routing operations. The API directory module 304 may be configured to store and manage various interfaces for interacting with third party application servers, M2M devices 212, and M2M application servers 210, as well as manage subscriber groups, group aliases, organization units, etc. The developer resource module 306 may be configured to manage the interfaces to various developer resources. The communications management module 308 may be configured to perform network selection and offloading operations, failover operations, and may serve as a single point of contact (SPOC). The transaction management module 310 may be configured to perform atomicity, consistency, isolation, and durability (ACID) operations to and/or manage ACID properties to guarantee that transactions are processed reliably.

The active address book module 312 may be configured to manage and/or store reachability information, scheduling information, application data, and address mappings, as well as to handle subscriptions, provide turn notifications, provide group management. The history and data-retention management module 314 may be configured to perform policy driven data retention operations. The remote entity management module 316 may be configured to various operations, including provisioning of management objects, collection of data, triggering collection establishment, and managing device upgrades.

The MEE component 116 may include an analytics engine (not shown) to record and provide basic logging and statistical information relating to M2M devices 212. Additionally, the analytics engine may be configured to use logging information in conjunction with additional contextual information obtained from other components within the telecommunications operator's network to generate semantically aware information.

The M2M identity management module 324 may be configured to provide the system with a scalable identity management solution that is suitable for use with M2M devices 212, M2M services, and M2M communications. That is, the ubiquity of M2M devices, combined with the expected proliferation of M2M services, is likely to put the existing mobile network identity management systems under severe pressure, because these identity management systems were not intended to be scalable. Furthermore, existing identity management systems are designed for managing identities that are tightly coupled to individual subscribers, and thus are associated with a large set of metadata and change infrequently. In contrast, identities used with M2M services may not be associated with individual subscribers and they may have very short life spans. By including an M2M identity management module 324 in the MEE component 116, the various embodiments provide improved identity management solutions that are scalable and suitable for use with current and future M2M devices 212 and services.

For example, M2M devices 212 may have identity values (e.g., A, B, and C) that are dependent on either their hardware (e.g., MAC address, SIM Integrated Circuit Cart Identifier (ICCID)) or virtualised hardware (e.g., a virtual SIM). The M2M identity management module 324 may store and use these identity values to accomplish/route the communications between the M2M devices 212 and the MEE component 116.

The M2M identity management module 324 may be configured to associate every M2M device 212 with zero or more M2M services, each of which may be provided by one or more M2M application servers 210. Each of these associations may be initiated by the M2M device owner or the M2M service provider as part of the service invocation or using an out-of-band mechanism.

As part of associating an M2M device 212 with an M2M service, the M2M identity management module 324 may create a pseudonym identity that is suitable for use in accomplishing the communications between an M2M device 212 and the M2M application server 210. For example, the M2M identity management module may create the pseudonym identities of "$A_1$," "$A_2$," and "$A_3$" for an M2M device 212 having an M2M device identity of "A." Each of these pseudonym identities may be bound to a hardware-based identity (e.g., "A"), which may be accomplished by using the identity of the M2M service provider (or the identity of the M2M service if a single M2M service provider can provide multiple M2M services). This relationship between hardware based identities, M2M service providers, and pseudonym identities is shown in the table 1 below.

TABLE 1

| Hardware Based Identity | M2M Service Provider | Pseudonym Identity |
|---|---|---|
| A | 1 | $A_1$ |
| A | 2 | $A_2$ |
| A | 3 | $A_3$ |
| B | 1 | $B_1$ |
| B | 2 | $B_2$ |
| C | 1 | $C_1$ |

The M2M identity management module 324 may be configured to allow the MEE component 116 to communicate with an M2M device 212 using a hardware-based identity, and with an M2M application server 210 using a pseudonym identity. That is, since all communications between the M2M device 212 and the M2M application servers 210 pass through the MEE component 116, the M2M identity management module 324 may substitute hardware based identities with pseudonym identities, and vice-versa, to facilitate M2M communications between these components.

A single pseudonym identity may be used to communicate information between a single M2M device 212 and multiple M2M application servers 210, such as in scenarios where the M2M device owner wishes to allow multiple M2M application servers 210 to collaborate to provide an enhanced service. For example, the owner of an M2M device 212 embedded in a car may be willing to allow both a server managed by a local dealership (e.g., where the car was purchased) and a server managed by the manufacturer of the car to collaboratively share information that is obtained from an M2M device within the car. In such scenarios, the M2M identity management module 324 may use a single pseudonym identity (e.g., $A_1$) to communicate with multiple M2M application servers 210.

In an embodiment, the M2M identity management module 324 may be configured to allow the MEE component 116 to associate two or more M2M devices 212 together to form a M2M device group. The service provider may subsequently treat this device group as a single entity from a device management point of view. For example, a service provider that provides a vehicle tracking service may create device groups for each of emergency service vehicles (e.g., ambulances, fire brigades, etc.), corporate fleet vehicles, and private vehicles. The service provider may then incorporate these device groups into policies within the MEE component 116, such as the service provider may create a policy that prioritizes data received from the emergency service vehicle device group over the other device groups.

In an embodiment, the M2M identity management module 324 may be configured to allow M2M device owners and/or M2M service providers to create group based pseudonym identities in which each group identity is mapped to two or more pseudonym identities and hardware-based identities. The M2M identity management module 324 may be configured to associate multiple independent M2M service identities with a single hardware identity (e.g., A1, A2, and A3 may all be associated with A). This enables multiple M2M service providers to use a single M2M device without being able to correlate their data based upon the device identity.

The use of pseudonym identities by the M2M identity management module 324 provides a number of benefits over existing solutions. First, it prevents the M2M application servers 210 from obtaining the real identity (i.e. the hardware based identity) of the M2M devices 212, which provides the M2M device 212 with greater privacy and prevents two or more nefarious M2M service providers from colluding by correlating information using a common identity. In addition, the pseudonym identity can be destroyed when the M2M device 212 is no longer associated with a particular M2M service or M2M application server 210 without impacting other M2M services used by the M2M device 212. This provides an additional level of security and privacy for the M2M device 212 without impacting the performance of the network. Further the use of a pseudonym identity allows the network operator to use any internal M2M device addressing scheme without having to consider its impact on M2M service providers or M2M application servers 210. In addition, the use of pseudonym identities allows the system to substitute one M2M device 212 for another (e.g. due to a hardware failure) without impacting the M2M service providers or M2M application servers 210.

In various embodiments, the M2M identity management module 324 may be configured to allow M2M device owners to manage (e.g., create, revoke, etc.) their M2M device identities using a web interface, a device-based user interface, an API, etc.

The trigger scheduling module 326 may be configured to intelligently schedule trigger communications for transmission so the system is not required to rely on third party M2M application servers 210 to send triggers at the correct time or under the correct conditions. The M2M application servers 210 may the send trigger communication messages to the MEE component 116, and the MEE component 116 may communicate with other components in the network to receive information suitable for use in determining an optimal time or way to communicate the trigger message to minimize network traffic and congestion. Based on this information and information included in the trigger communication message, the MEE component 116 may determine to send the trigger communication message immediately, schedule the trigger communication message for transmission at a future date/time, or reject the trigger by not transmitting the trigger communication message. This simplifies the operations that are required to be performed by M2M application servers 210, and improves the overall performance of the network.

In an embodiment, the trigger scheduling module 326 may be configured to use contextual information to treat individual trigger communication messages, or individual groups of communication messages, differently. The trigger scheduling module 326 may be configured to obtain the contextual information from the trigger communication message, from a network database, or from the other components in the network. This contextual information may include information identifying a trigger priority (e.g. level from 1 to 5) or a time value, range, or period in which the trigger must be communicated. This contextual information may also include information identifying an amount of data that the trigger will generate, the types of data that the trigger may generate, a maximum amount that the third party is willing to pay for communicating the trigger, balance information (e.g. a monetary balance or a usage balance), subscriber profiles (e.g. gold/silver/bronze), group based information relating to the group of devices to which a target M2M device belongs, current network congestion levels, expected future network congestion levels, cost or usage based tariff information, etc. The trigger scheduling module 326 may be configured to use any or all of such information to determine whether trigger communication messages should be sent to an M2M device, when or at what time the trigger communication messages should be sent to an M2M device, and/or under what conditions the trigger communication messages should be sent to an M2M device.

In various embodiments, the M2M device 212, M2M application server 210, MEE component 116, and/or other components in the network may be configured to augment trigger communication messages to include additional information, such as trigger priority values, maximum allowable time values, expected amounts of generated data values, expected types of data values (e.g., once off data update versus streaming media, etc.), maximum cost values, etc.

The trigger scheduling module 326 may be configured to use the trigger priority values to differentiate between triggers from the same third party M2M application server 210, and schedule the transmission of the trigger accordingly (e.g., by scheduling high priority triggers to be transmitted before lower priority triggers). In an embodiment, the trigger scheduling module 326 may be configured to use the trigger priority values to accomplish the same operations that may be accomplished by 3GPP EPS bearers via a QoS Class Index (QCI).

The trigger scheduling module 326 may be configured to use the maximum allowable time values to determine the latest time that this trigger can be sent, and schedule the transmission of the trigger accordingly. For example, a non-real-time application may require that the trigger be processed sometime before the start of the next business day, and thus may request that the trigger scheduling module 326 send the trigger sometime in the next twelve hours by setting the maximum allowable time value to "12 hours." As another example, a real-time application that requires the trigger be processed immediately may set the maximum allowable time value to be equal to "0," which may cause the trigger scheduling module 326 to schedule the trigger for immediate transmission.

The trigger scheduling module 326 may be configured to use the expected amounts of generated data values to determine the amount of data that the trigger will generate, and schedule the transmission of the trigger accordingly. For example, a trigger to a vending machine may result in 1 KB of information being communicated across the network, whereas a trigger to a security camera may result in hundreds of megabytes of data being communicated across the network. The trigger scheduling module 326 may use this information to schedule the transmission of the trigger communication message at a time when the network can best support the additional traffic generated as a result of communicating the trigger.

The trigger scheduling module 326 may be configured to use the maximum cost values to determine maximum amount that the third party is willing to pay for the communication of the trigger, and schedule the transmission of the trigger accordingly. This allows the network operator to provide dynamically priced services based upon the operating conditions of the network, such as the network utilization levels, available bandwidth, etc. For example, the network operator may set the price for communicating trigger messages to be commensurate with the amount of bandwidth that is available in the network, and the trigger scheduling module 326 may use this information to determine not to send a trigger communication message when bandwidth is such that the price of communicating the trigger is above the maximum cost value identified in the trigger.

The trigger scheduling module 326 may be configured to schedule the trigger communication messages for transmission based on the network state, such as the overall current network congestion levels, current network congestion levels of the cell/area that the destination M2M device 212 is located, projected future congestion levels (e.g. when the congestion is expected to go below a certain threshold). The trigger scheduling module 326 may also be configured to schedule the trigger communication messages for transmission based on cost based tariff information, which may identify a cost and/or cost tolerance of communicating information across the network under certain network conditions or at certain times (e.g., communicating the trigger, or the expected data generated by the trigger, is cheaper between the hours of 1 and 6 AM, etc.).

Figure 4:
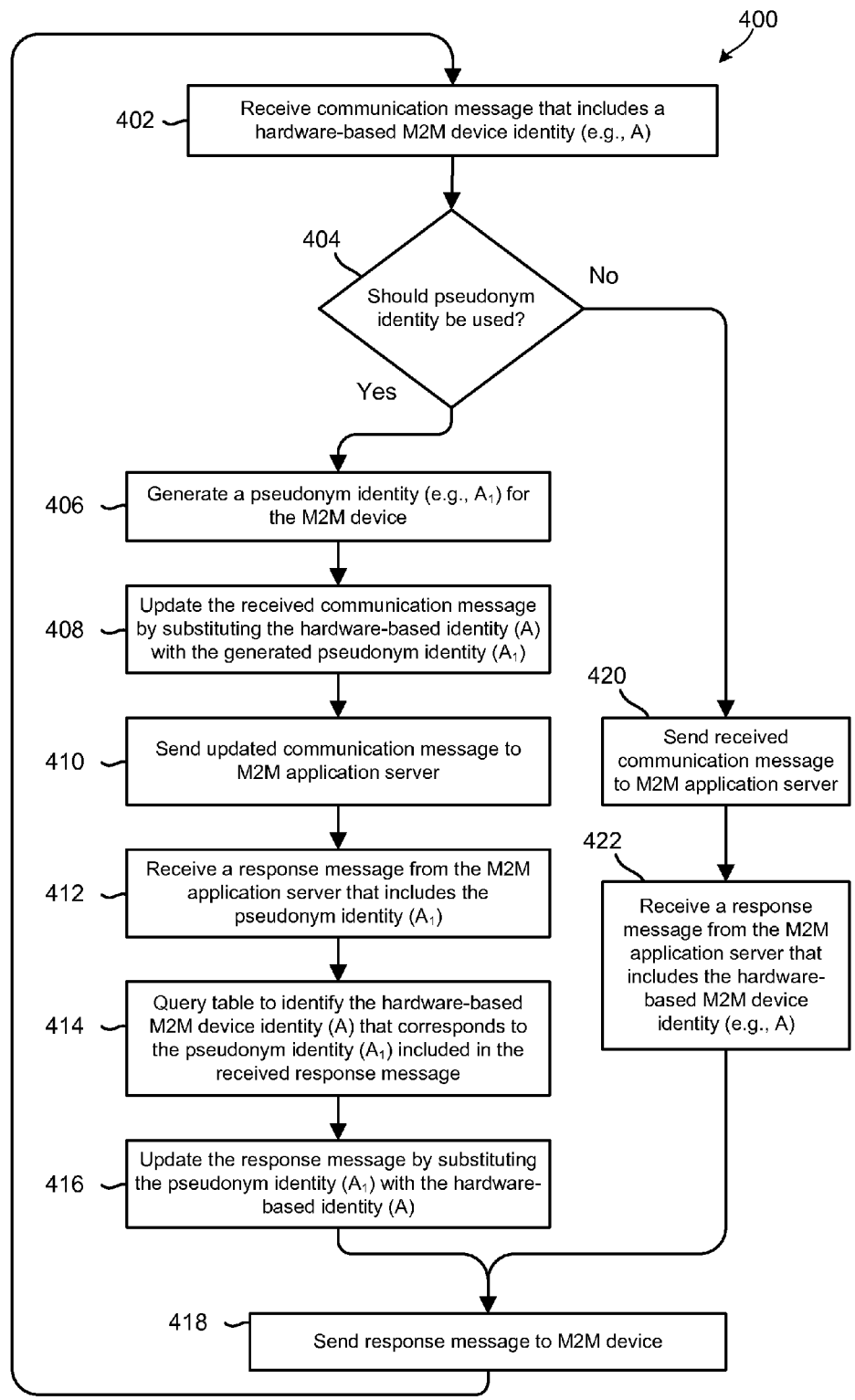
FIG. 4 is a process flow diagram illustrating embodiment method of managing identities of machine-to-machine devices and servers.

FIG. 4 illustrates an embodiment method 400 of managing identities of M2M devices 212 so that M2M service providers do not obtain the M2M device's real (i.e. hardware based) identity. Method 400 may be performed by a processing core in network server deployed in the mobile network operator domain 254 of a wireless telecommunication network. The network server may be, or may include, a MEE component 116 and/or an M2M identity management module 324.

In block 402, the processing core may receive a communication message from an M2M device 212 that includes a hardware-based M2M device identity (e.g., "A") of the M2M device 212 and that is destined for an M2M application server 210 in the M2M service provider domain 256. In block 404, the processing core may determine whether a pseudonym identity should be used for the communications between the M2M device 212 and the M2M application server 210.

When the processing core determines that a pseudonym identity should be used for the communications between the M2M device 212 and the M2M application server 210 (i.e., determination block 404="Yes"), in block 406, the processing core may generate a pseudonym identity (e.g., $A_1$) for the M2M device 212. In block 408, the processing core may update the received communication message by substituting the hardware-based identity (i.e., A) with the generated pseudonym identity (i.e., $A_1$). In block 410, the processing core may send the updated communication message to the M2M application server 210, which may receive the updated communication message and perform various M2M operations based on information included in the updated communication message.

In block 412, the processing core may receive a response message from the M2M application server 210 that includes pseudonym identity (i.e., $A_1$) and the results of the M2M operations performed in the M2M application server 210. In block 414, the processing core may query a table or perform a hash or similar operation to identify the hardware-based M2M device identity (i.e., A) that corresponds to the pseudonym identity (i.e., $A_1$) included in the received response message. In block 416, the processing core may update the response message by substituting the pseudonym identity (i.e., $A_1$) with the hardware-based identity (i.e., A). In block 418, the processing core may send the updated response message to the M2M device 212.

If the processing core determines that a pseudonym identity should not be used for the communications between the M2M device 212 and the M2M application server 210 (determination block 404="No"), in block 420, the processing core may send the communication message to the M2M application server 210, which may receive the communication message and perform various M2M operations. In block 422, the processing core may receive a response message from the M2M application server 210 that includes the hardware-based M2M device identifier (i.e., A) and the results of the M2M operations performed in the M2M application server 210. In block 418, the processing core may send the response message to the M2M device 212.

Figure 5:
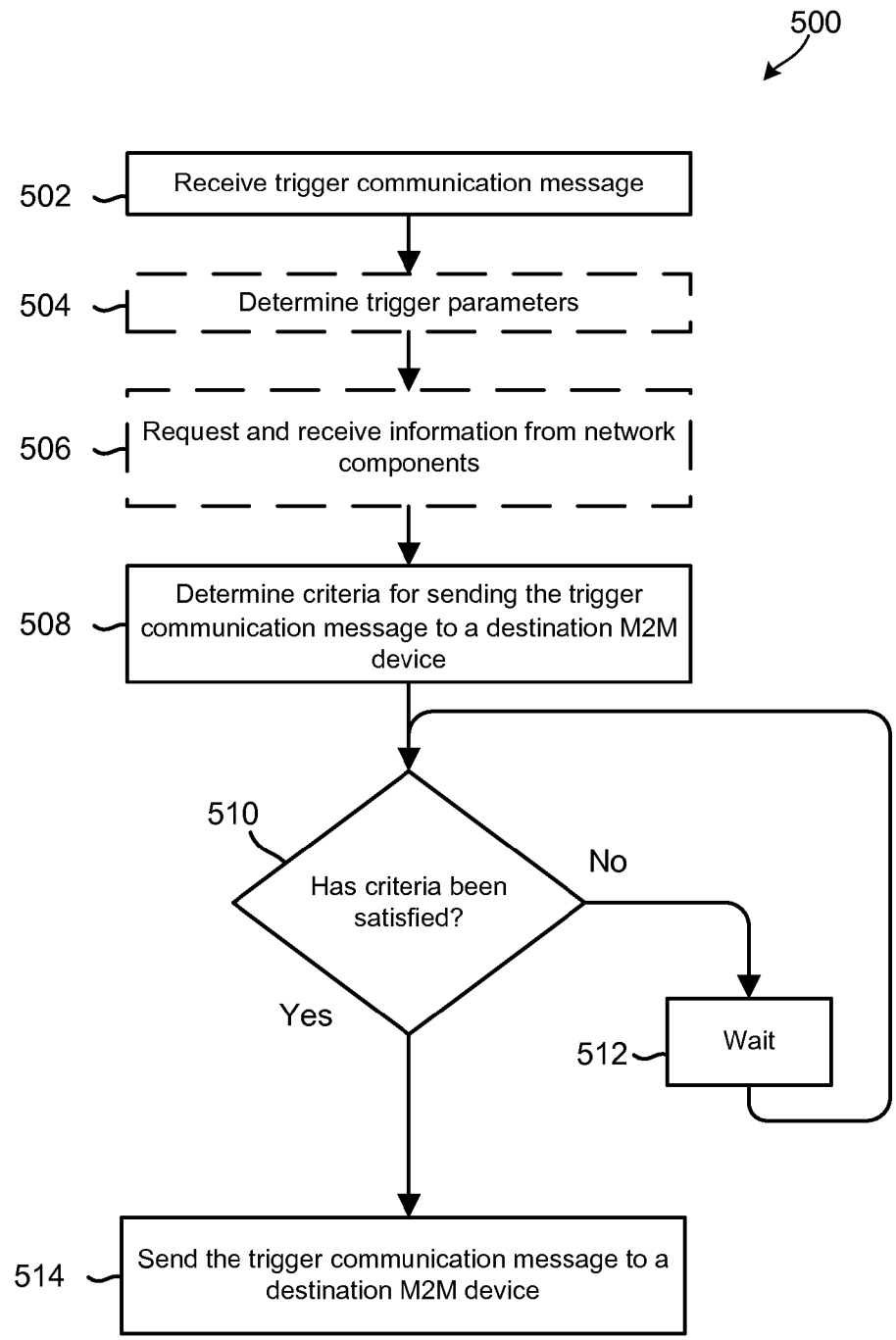
FIG. 5 is a process flow diagram illustrating embodiment method of scheduling trigger communication messages for transmission across the network.

FIG. 5 illustrates an embodiment method 500 of scheduling trigger communication messages for transmission across the network. Method 500 may be performed by a processing core in a network server deployed in the mobile network operator domain 254 of a telecommunication network. The network server may be, or may include, a MEE component 116 and/or a trigger scheduling module 326.

In block 502, the processing core may receive a trigger communication message from an M2M device 212 or an M2M application server 210. In optional block 504, the processing core may determine whether the trigger communication message includes trigger parameters, such as a trigger priority value, maximum allowable time value, expected amounts of generated data value, expected types of data value, maximum cost value, etc. In optional block 506, the processing core may request and receive information from network components deployed in the mobile network operator domain 254, such as from an online charging system 202, a policy management system 204, or a congestion management system.

In block 508, the processing core may use the trigger parameters and/or information received from the network components to intelligently determine or generate criteria for sending the trigger to a destination M2M device 212 or M2M application server 210. The criteria may include information suitable for determining if or when the trigger communication message should be sent. The criteria may also include information for identifying conditions or times in which the communication message should be sent. The criteria may also include information suitable for determining whether the processing core should send the trigger communication message immediately, reject the trigger communication message, or schedule the trigger communication message for transmission at the future time and/or based on a future network condition.

In determination block 510, the processing core may determine whether the criteria have been satisfied. In various embodiments, the determination of whether the criteria have been satisfied may be time based, cost based, data volume based, priority based, group based, and/or based on any other information that may be made available to a MEE component 116. Also in determination block 510, the processing core may determine whether the criteria for sending the trigger communication message have changed. The processing core may also determine whether the criteria have changed at certain predefined times (e.g., every 5 minutes), predefined levels of network utilization (e.g., when human related services are less than 40%), when certain other external events occur (e.g. network outage), etc.

When the processing core determines that the criteria has not been satisfied (i.e., determination block 510="No"), the processing core may wait for a period of time in block 510 and reevaluate whether the criteria has been satisfied in block 510. This waiting operation may performed based upon a subscribe-and-notify model in which the processing core subscribes to receive notification messages, such as when the network utilization goes below a certain percentage (e.g., 60%), and waits until it receives the notification. The processing core may also determine that the criteria will not be met (e.g., the time period for receiving the notification has expired or timed-out) and send an error message to the M2M application server to notify it that the trigger communication message will not be transmitted.

When the processing core determines that the current criteria has been satisfied (i.e., determination block 510="Yes"), in block 514, the processing core may send the trigger communication message to the destination device via the control plane manager 208.

In an embodiment, the processing core intelligently determining/generating criteria for sending the trigger to a destination M2M device 212 or M2M application server 210 in block 508 may include determining/generating a time-based criterion. For example, if a trigger parameter indicates that trigger communication message may be delayed by a maximum of twelve hours, and the information received from the network components indicates that the network is currently congested, the processing core may generate and set the criteria for transmitting the trigger communication message to include a transmission time that is within the next 12 hours and during which the network is expected to experience low levels of congestion (e.g., 2 AM).

In an embodiment, intelligently determining/generating criteria may include the processing core determining/generating a cost-based criterion. For example, if the information received from the network components indicates that the immediate transmission of the trigger communication message will cost the subscriber more than the maximum amount the subscriber is willing to pay (which may be determined from the maximum cost value included in the trigger parameters), the processing core may generate and set the criteria to include a network communication cost that is lower than the current network communication cost and/or less than the value of the maximum cost value trigger parameter.

In an embodiment, intelligently determining/generating criteria may include the processing core generating a data volume-based criterion. For example, if the information received from the network components and/or trigger parameters indicate that the amount of data that will be generated by the trigger and/or the device profile are such that the immediate transmission of the trigger communication message is likely to cause or further contribute to network congestion, the processing core may generate and set the criteria to include a network congestion level that is below the current level, that will allow the network support the expected increase in data volume without impacting performance, and/or a time during which the network is expected to experience lower levels of network congestion (e.g., 2 AM).

In an embodiment, intelligently determining/generating criteria may include the processing core generating a priority-based criterion. For example, the information received from the network components may indicate to the processing core that there are a hundred trigger communication messages waiting to be transmitted for a single subscriber, and that the subscriber's account only has enough funds to transmit fifty of the waiting messages. In this case, the processing core may generate and set the criteria to include a trigger priority level that is higher than fifty percent of the messages waiting to be transmitted, so that the fifty messages with the highest priority are sent.

In an embodiment, intelligently determining/generating criteria may include the processing core generating a group-based criterion. In this embodiment, determining whether the criteria has been satisfied may include the processing core determining whether the subscriber belongs to a group, and if so, whether other trigger communication messages have been processed or transmitted for other devices/components in that same group. The processing core may determine that the group-based criterion has been met when it determines that other trigger communication messages have been processed or transmitted for other devices/components that belong to the same group. In this embodiment, the processing core may be configured to perform the same or similar operations for processing/transmitting the received trigger communication message as those performed for the other devices/components in the same group. As an example, the processing core may receive a trigger for Device A in Group X and based on the current network state it decides to hold off sending a trigger for 2 hours. The processing core may cache that decision for all devices in Group X so that when a new trigger communication message is received for Device B in Group X, it can automatically apply the same action without having to lookup the network state again.

In an embodiment, the MEE component 116 may be configured to reschedule the currently scheduled triggers and/or modify the criteria for transmitting the received triggers. For example, if the MEE component 116 scheduled 500 triggers to be sent between the hours of 00:00 and 05:00 at a rate of 100 per hour, and receives an additional 1000 trigger communication message that require transmission between the hours of 00:00 and 02:00, the MEE component 116 may reschedule currently scheduled triggers to be sent between the hours of 03:00 and 05:00.

Figure 6:
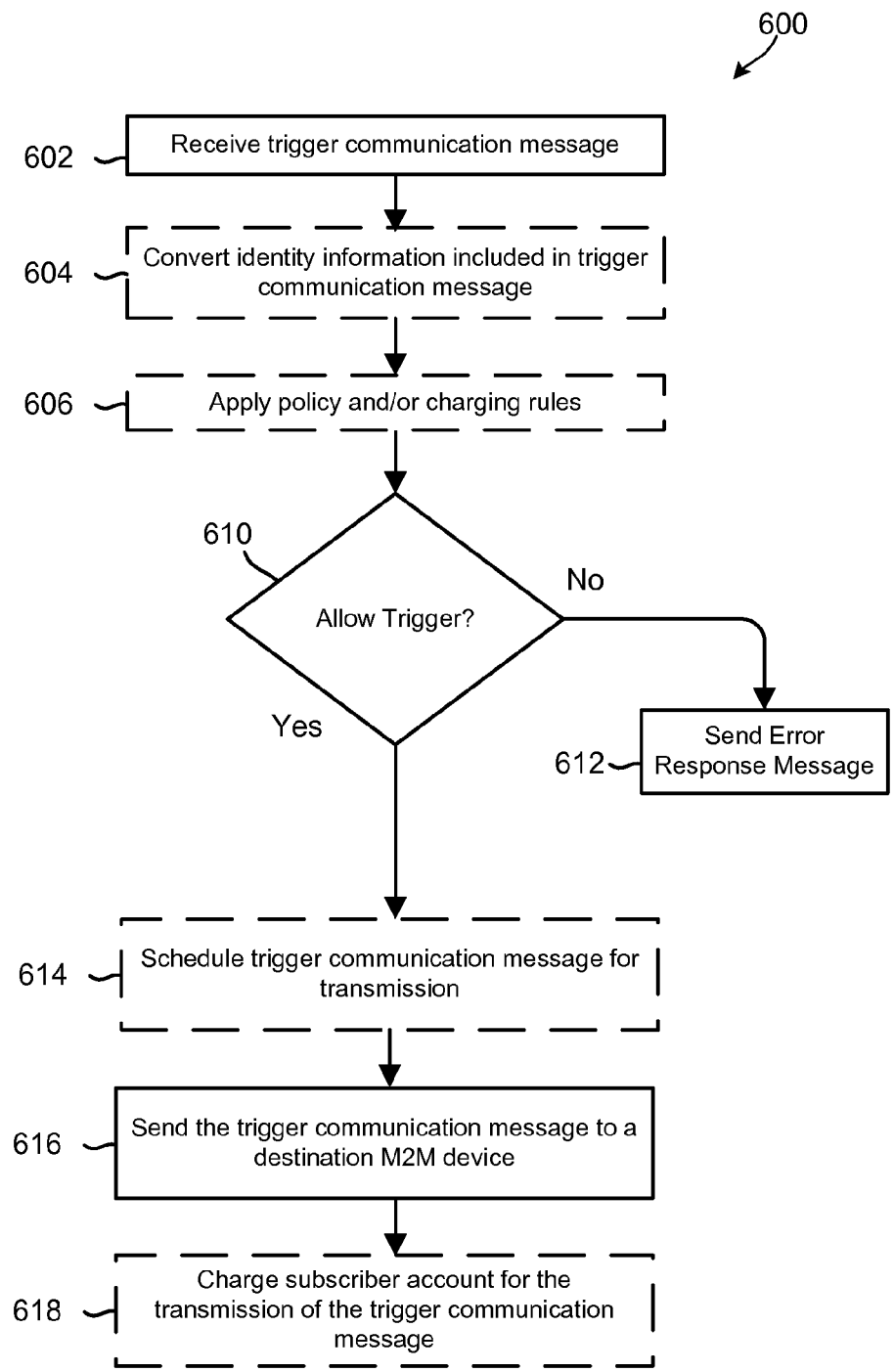
FIG. 6 is a process flow diagram illustrating embodiment method of performing advanced triggering operations.

FIG. 6 illustrates an embodiment method 600 of performing advanced triggering operations. Method 600 may be performed by a processing core in a network server deployed in the mobile network operator domain 254 of a telecommunication network. The network server may be, or may include, an MEE component 116.

In block 602, the processing core may receive a trigger communication message from an M2M application server 210, and generate and send a notification message to the server 210 to acknowledge receipt of the trigger communication message. In optional block 604, the processing core may perform identity management operations, such as those discussed above with reference to FIGS. 3 and 4. For example, the processing core may replace a pseudonym identity value with a hardware based M2M device identity value, replace an individual identity value (e.g., a pseudonym identity, a hardware based identity) with a group identity value, etc.

In optional block 606, the processing core may request, receive, retrieve, process, apply, and/or analyze policy and charging information to generate information that is suitable for use in determining whether the trigger communication message should be blocked. The processing core may retrieve the policy and charging information from a memory of the network server, or request and receive the information from components in the network, such as the online charging system 202 or the policy management system 204.

In determination block 610, the processing core may use the received and/or generated information to determine whether the trigger communication message should be sent to the destination M2M device 212. In an embodiment, in determination block 610, the processing core may also determine whether it has received a subsequent message to cancel or recall a scheduled trigger from the M2M application server 212, and determine that the trigger communication message should not be sent to the destination M2M device when the processing core determines that a subsequent message to cancel or recall a scheduled trigger has been received.

When the processing core determines that the trigger communication message should not be sent to the destination M2M device 212 (i.e., determination block 610="No"), in block 612, the processing core may send an error response message to the M2M application server 210 to notify it that the trigger was blocked.

When the processing core determines that the trigger communication message should be sent to the destination M2M device 212 (i.e., determination block 610="Yes"), in optional block 614, the processing core may perform various operations to schedule the trigger communication message for transmission. For example, the processing core may perform the scheduling operations discussed above with reference to FIGS. 3 and 5. In block 616, the processing core may send the trigger communication message to a destination M2M device 212, and notify the M2M application server 210 that the trigger has been sent.

In block 618, the processing core may charge the subscriber account associated with the M2M application server 210 and/or destination M2M device for the communication based on network conditions and/or properties of the communication (e.g., data volume, etc.). This may be accomplished by the processing core sending charging details to either an online or offline charging system (e.g., OCS/OFCS component 114).

The MEE component 116 may be configured to provide a combination of the functionalities typically provided in 3GPP network by a Services Capability Server (SCS) and a Machine Type Communications-Interworking Function (MTC-IWF) server, and/or functionally typically provided in an ETSI network by a Service Capability Layer (SCL) component. In addition, the MEE component 116 may communicate with other components in the network to perform advanced triggering operations.

In a 3GPP-based network, the SCS and MTC-IWF combine to interact with the mobile network and provide machine-to-machine services to external third party application servers. The MTC-IWF is a signaling-only node whose main purpose is to trigger machine-to-machine devices on the network (i.e., wake them up so that the application servers can send/receive data to/from them). The SCS handles signaling traffic (trigger requests that it sends on to the MTC-IWF) as well as data-plane data which is delivered to/from the third party application server. For downlink data, the SCS triggers the MTC-IWF to wake up the device if there is not an active data session. Once the device is connected to the network, the SCS would send data to the device over the Gi or SGi interface. For uplink data, the device would connect to the network (if not already connected) and send data over the Gi or SGi interface.

In an ETSI-based network, M2M communications are facilitated via two interfaces: mIa and mId. The mIa interface operates between the SCL component and the M2M application servers 210, while the mId interface operates between the SCL component and the M2M device 212 (or a gateway that represents multiple machine-to-machine devices). The SCL component may present machine-to-machine functions that are shared between different applications. For example, the SCL component may expose the machine-to-machine capabilities of the network to the third party application server and allow that application server obtain data from the machine-to-machine devices.

In the various embodiments, the MEE component 116 may be configured to perform the interface functionalities of a combination of the M2M components included in 3GPP and ETSI based networks. In an embodiment, the MEE component 116 may be configured to implement the Diameter based Tsp interface protocol between the MTC IWF and the SCS, process device trigger requests from the SCS and send confirmations to the SCS when the trigger request has been received by the MTC-IWF, and send the notification of a device trigger to the SCS.

In an embodiment, the MEE component 116 may allow the Diameter based Tsp interface to be externally facing. The SCS may be internal or external to the mobile operator's network, therefore the Tsp interface may be externally facing and interact with third party application developers. The Tsp interface may be secure so as to prevent malicious external entities from connecting to the internal network. It may also protect against attacks such as denial of service attacks, and ensure that it is not possible for external nodes to access data in the SCS.

In an embodiment, the MEE component 116 may be configured to implement a non-standard, non-Diameter, Tsp-like interface for use with external application developers. As the SCS may be external to a mobile operator's network, and Diameter may not be well supported by application developers, and it may be beneficial to offer a different interface with the same functionality as Tsp, but aimed at the application developer community. This interface may perform the same functionality as Tsp, and it may be based on the common principles of the protocols used in the application developer community (easy to adopt, lightweight, based on commonly used protocols, etc.).

Figure 7:
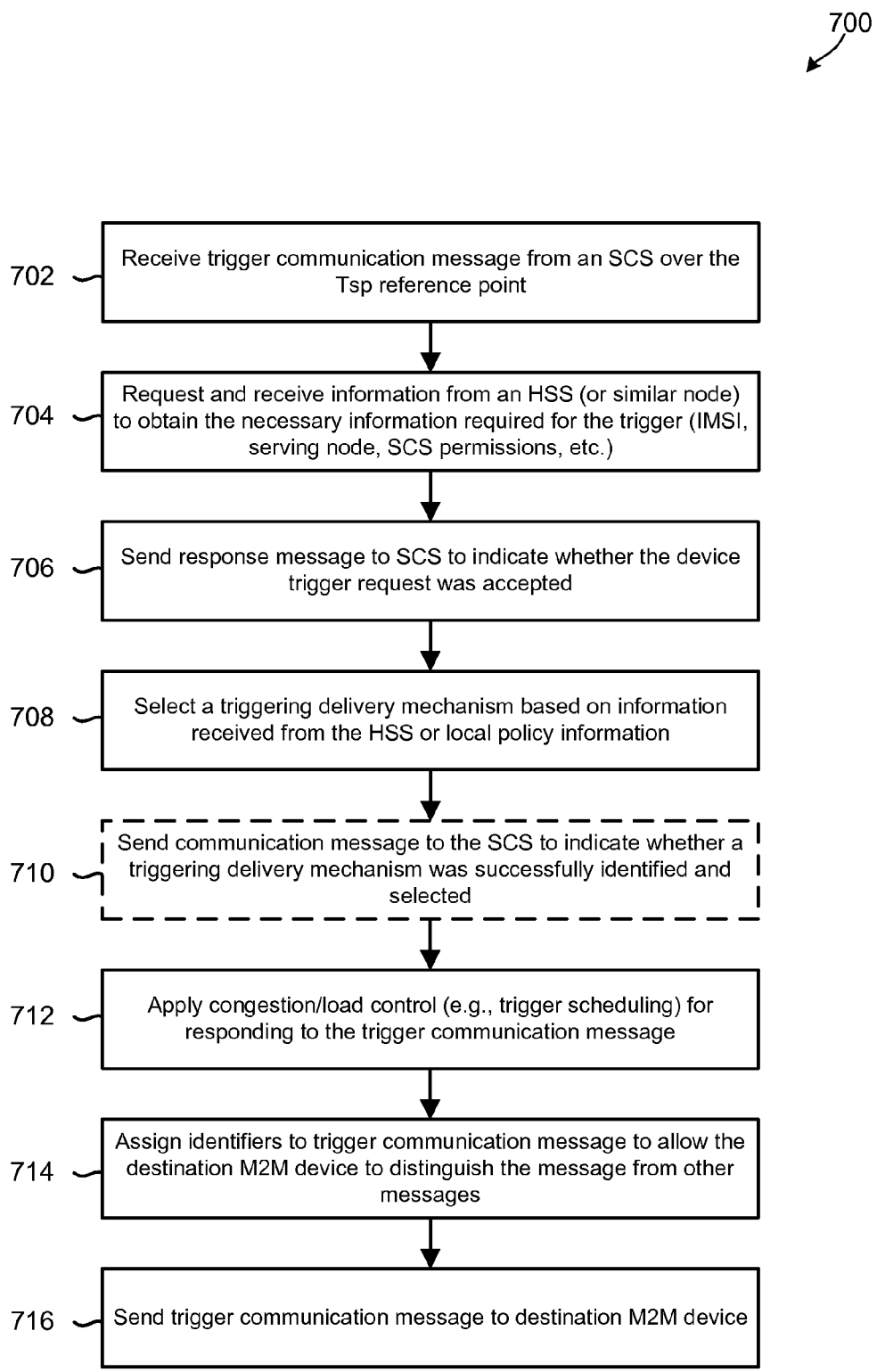
FIG. 7 is a process flow diagram illustrating another embodiment method of performing advanced triggering operations.

FIG. 7 illustrates another embodiment method 700 of performing advanced triggering operations. Method 700 may be performed by a processing core in a network server deployed in the mobile network operator domain 254 of a telecommunication network. The network server may be, or may include, a MEE component 116.

In block 702, the processing core may receive a trigger communication message request from a SCS component over the Tsp reference point. In block 704, the processing core may request and receive information from a HSS (or similar node) to obtain the necessary information required for the trigger communication message (e.g., IMSI, serving node, SCS permissions, etc.). In block 706, the processing core may generate and send a response message to the SCS component to indicate whether the device trigger request was accepted or blocked. In block 708, the processing core may select an effective and efficient triggering delivery mechanism for delivering the trigger communication message to the destination device based on information obtained from the HSS component or based on local policies. For example, in block 708, the processing core may identify the control plane manager 208 to which a destination M2M device 212 is attached and/or based on the M2M device's 212 capabilities, current serving node, information received from the SCS component, etc.

In optional block 710, the processing core may generate and send a communication message to the SCS component to indicate whether a triggering delivery mechanism was successfully identified and/or selected to deliver the trigger communication message to the destination M2M device 212. In block 712, the processing core may apply congestion/load control for responding to the trigger communication message. For example, in block 712, the processing core may perform the trigger scheduling operations discussed above with reference to FIGS. 3, 5, and 6.

In block 714, the processing core may assign identifiers to the trigger request to allow the user equipment distinguish the message from other messages. For example, in block 714, the processing core may perform any of the identity management operations discussed above with reference to FIGS. 3, 4 and 6. In block 716, the processing core may send the trigger communication message to the destination M2M device via the selected triggering delivery mechanism (e.g., via the selected control plane manager 208).

In an embodiment, the MEE component 116 may be configured to implement a policy based interface to a policy system, such as the PCRF component 112 and/or PMS component 204. In an embodiment, the MEE component 116 may be configured to implement a charging based interface to a charging system, such as the OCS/OFCS component 114 or OCS component 202.

The policy based interface may allow policy decisions to be made regarding machine-to-machine data sessions, including policy decisions that can be made before a data session has been established. This may be useful in scenarios where policy pre-implementation is beneficial before a data session has been established based on a trigger being sent to the device. For example, during triggering of a device, the PCRF component 112 can be informed as the trigger is being sent over the control plane interfaces. This may allow the PCRF component 112 to pre-determine a policy before the data session starts. The PCRF component 112 may perform all necessary steps to determine the policy (SPR lookup, decision logic, etc.) in advance of the GGSN/PGW getting the session or bearer establishment request.

The policy based interface may also allow resource validation to be accomplished before the trigger is sent. For example, MEE component 116 may be configured to determine whether the device has the correct policy necessary to allow the data session before transmitting the trigger. For example, the MEE component 116 may determine that there is no point in triggering the device if it is not allowed to access the network (due to time of day controls, being out of credit, exceeding a number of connections etc.). The MEE component 116 may be configured to communicate with the PCRF component 112 and decide whether to allow or block the triggering request based on the resource validation information received from the PCRF component 112.

In an embodiment, the policy based interface may be used to modify the trigger before it is sent to downstream nodes based on information received by the PCRF component 112. For example, the PCRF component 112 may determine that this is a low-value customer/device and therefore the trigger may be labeled as low priority for treatment in the MME/SGSN/SMS-SC etc. Alternately, if the PCRF component 112 determines that this is a high priority trigger, then it may be sent over multiple paths or labeled as prioritized using packet marking.

In an embodiment, the policy based interface may allow for the pre-reservation of bandwidth/resources. For example, the MEE component 116 may be configured to receive a request for resources from the third party application server (acting as an SCS), and determine whether the request for resources actually requires that additional resources be allocated in the network based on the information received from the PCRF component 112. This interaction may be viewed as an Rx style interaction, with the application server requesting the resources, and the PCRF component 112 allocating them in the PCEF/PGW component 110 (e.g., setting up a dedicated bearer, modifying an existing bearer etc.). In an embodiment, the MEE component 116 may be configured to determine whether to block or send a trigger communication message originating from the third party application server to a destination device based on whether or not communicating the trigger communication messages will require that the network allocate additional resources. In an embodiment, the MEE component 116 may be configured to determine reserve or pre-allocate resources based on the request for resources received from the third party application server.

In an embodiment, the policy based interface may allow the MEE component 116 (acting as an SCS) to query the PCRF component 112 for policy information regarding policies currently installed for a device. This may also applicable to a group of devices that share a common set of policies.

In an embodiment, the policy based interface may enable the MEE component 116 to send notifications and/or information about a trigger to the PCRF component 112. This information can include AVPs including: the device being triggered (MSISDN or External-Id AVP); priority information (Priority AVP); the trigger payload (Trigger-Payload AVP); and requested session information as received by the SCS from the Application Server (e.g., information about desired session).

In an embodiment, the policy based interface may enable the MEE component 116 to request policy information from the PCRF component 112. This may include triggering specific policies such as "is a trigger allowed at this time." It may also include a request for the amount of data triggers allowed per month, and whether the device is close to that limit. Aside from triggering, the request may be for information around bandwidth, QCI, APR or other QoS related parameters. The information in the request may include: the device being triggered (MSISDN or External-Id AVP); the information requested; triggering policy (allowed/blocked); signaling information (number of connections allowed per month and current total if available); QoS information (including whether the QoS should be reserved or not); data usage information (if available in the PCRF); device group based information such as the group the device is in; and time related information, e.g., for the cases where different policies apply at different times (i.e., the times for the requested policies).

In an embodiment, the policy based interface may enable the MEE component 116 to respond to policy information received from the PCRF component 112. This may be in response to a previous request for policy information. The response may contain information such as: the policy related information for the subscriber; triggering allowed/blocked information; QoS, signaling and/or data related information; the times the policies are to be applied (e.g., for the case where different policies apply at different times); and group-related policy information such as the group containing the device.

As mentioned above, the MEE component 116 may be configured to provide or include a charging based interface to a charging system, such as the OCS/OFCS component 114 and the OCS component 202. This charging interface may allow the following functionality: M2M specific charging, e.g., charging per connection, charging differently at different times, combined charging for groups of devices; obtaining balance information (e.g., to display to the application servers, to send a notification to an application server, to alter the behavior on the network based on a balance, rating plan, etc.); and modifying the balance or rating information (e.g., increase/decrease a balance, modify a rating plan, etc.).

In an embodiment, the charging based interface may enable the MEE component 116 to transmit triggering related charging information to the OCS/OFCS components 202, 112. This charging information may include the number of triggers used. The functionality required may be similar to the Rf/Ga interface from the MTC-IWF.

In an embodiment, the charging based interface may enable the MEE component 116 to report data usage to the OCS/OFCS component 114. This may be related to the data received over the Gi/SGi interfaces that is related to machine-to-machine traffic, e.g., usage of machine-to-machine traffic per device, and usage of machine-to-machine traffic per group of devices or per group subscription (e.g., for a company with multiple devices).

In an embodiment, the charging based interface may enable the MEE component 116 to report an aggregated amount of triggering related data to an OCS/OFCS component 114. This aggregated amount could come from a group of devices who share a single triggering balance.

In an embodiment, the charging based interface may enable the MEE component 116 to request an allocation of triggers to be sent to a device or to a group of devices (e.g., a company with multiple devices).

In an embodiment, the charging based interface may enable the MEE component 116 to request an allocation of data quota (in a Gy like manner) relating to machine-to-machine traffic for a device or group of devices.

In an embodiment, the charging based interface may enable the MEE component 116 to request balance information. This could enable third party application servers to observe their balance information relating to an individual device or group of devices.

In an embodiment, the charging based interface may enable the MEE component 116 to request subscription/ rating information. This could enable third party application servers (e.g., M2M application servers 210) to observe the current subscription and rating information relating to a device or group of devices.

In an embodiment, the charging based interface may enable the MEE component 116 to modify rating plans. This could enable third party application servers (e.g., M2M application servers 210) to configure rating plans based on triggering and data usage in the OCS/OFCS component 114.

In an embodiment, the charging based interface may enable the MEE component 116 to modify balance and usage information. This could enable third party application servers (e.g., M2M application servers 210) to configure balance and usage information in the OCS/OFCS component 114.

In the various embodiments, the MEE component 116 may be configured to provide a third party application server interface that enables third party application servers (e.g., M2M application server 210) to access machine-to-machine functionality, e.g., data transmission, triggering, charging and policy related functionality.

In an embodiment, the third party application server interface may enable a third party application server (e.g., M2M application server 210) to transmit data to a device (e.g., M2M device 212) or group of devices. In a further embodiment, the MEE component 116 may be configured to trigger a device or group of devices before transmitting information so that the device connects to the network and the data may be transmitted to the downstream node over the Gi or SGi interfaces.

In an embodiment, the third party application server interface may enable a third party application server (e.g., M2M application servers 210) to retrieve data from a device (e.g., M2M device 212) or group of devices. This enables the third party application servers to initiate a pull request for data from a device or group of devices. In a further embodiment, the MEE component 116 may be configured to trigger a device or group of devices before receiving the information so that the device connects to the network and the information pull can commence (as directed by the third party application server).

In an embodiment, the third party application server interface may enable a third party application server (e.g., M2M application server 210) to request balance information relating to a device (e.g., M2M device 212) or group of devices. In an embodiment, the third party application server interface may enable a third party application server to request rating or account information relating to a device or group of devices. In an embodiment, the third party application server interface may enable a third party application server to modify balance or quota information (e.g., by purchasing additional quota or increasing balance). In an embodiment, the third party application server interface may enable a third party application server to modify rating or account information. In an embodiment, the third party application server interface may enable a third party application server to request policy information relating to triggering (e.g., number of triggers allowed per hour, is triggering currently allowed etc.).

In an embodiment, the third party application server interface may enable a third party application server (e.g., M2M application server 210) to request policy information relating to data usage (e.g., allowed bandwidth/QoS, bandwidth/QoS at certain times, etc.). In an embodiment, the third party application server interface may enable a third party application server to modify policy information relating to triggers associated with the subscription plans of the third party application servers.

Figure 8:
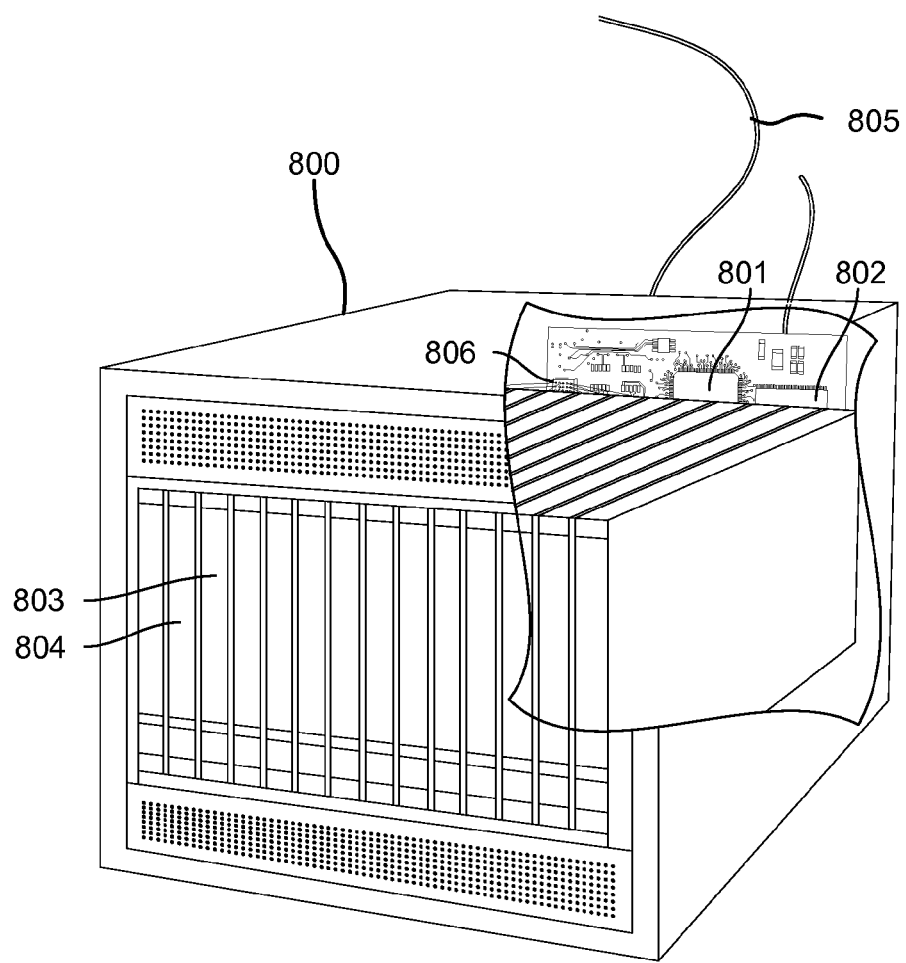
FIG. 8 is a component diagram of server suitable for use with the various embodiments.

The various embodiments may be implemented on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 805, such as a local area network coupled to other operator network computers and servers.

The processor 801 may be any programmable microprocessor, microcomputer or multiple processor chip or chips that can be configured by software instructions (applications) to perform a variety of functions, including the functions of the various embodiments described below. Multiple processors 3101 may be provided, such as one processor dedicated to wireless communication functions and one processor dedicated to running other applications.

Further, one or more processors 3101 may be included in a processing core, which may be single processor, a multi processor system, an intellectual property core, a system on chip, etc. Typically, software applications may be stored in the internal memory 802 before they are accessed and loaded into the processor 801. The processor 801 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any non-transitory storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other non-transitory medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating triggers in a telecommunication network, the method comprising:
    receiving in a processor of a server computing device a trigger communication message from a source device, the trigger communication message including information suitable for causing a destination device to automatically establish a connection to the source device to communicate application level information;
    receiving in the processor of the server computing device policy information from a component in the telecommunication network;
    using the received policy information to determine in the server computing device whether the destination device should automatically establish the connection to the source device to communicate the application level information;
    sending the received trigger communication message from the server computing device to the destination device in response to determining in the server computing device, based on the received policy information, that the destination device should automatically establish the connection to the source device to communicate the application level information.

2. The method of claim 1, wherein receiving the policy information from the component in the telecommunication network further comprises:
    receiving charging information via a charging based interface.

3. The method of claim 1, wherein receiving the policy information from the component in the telecommunication network comprises:
    receiving the policy information from a policy control rules function (PCRF) component.

4. The method of claim 1, wherein receiving the policy information from the component in the telecommunication network comprises receiving network congestion information.

5. The method of claim 1, further comprising determining based on the received policy information a time period during which the trigger communication message should be transmitted to the destination device to reduce network congestion, wherein using the received policy information to determine in the server computing device whether the destination device should automatically establish the connection to the source device to communicate the application level information comprises determining whether a current time is within the time period.

6. The method of claim 1, further comprising determining a time period during which the trigger communication message should be transmitted to the destination device to reduce an amount billed to a charging account associated with the source device, wherein using the received policy information to determine in the server computing device whether the destination device should automatically establish the connection to the source device to communicate the application level information comprises determining whether a current time is within the time period.

7. The method of claim 1, wherein using the received policy information to determine in the server computing device whether the destination device should automatically establish the connection to the source device to communicate the application level information comprises:
determining whether the trigger communication message should be sent to the destination device based on resource validation information received from a policy component in the telecommunication network.

8. The method of claim 1, further comprising:
determining a criterion for sending the trigger communication message to the destination device based on the received policy information in response to determining in the server computing device, based on the received policy information, that the destination device should automatically establish the connection to the source device to communicate the application level information; and
monitoring conditions to determine whether the determined criterion has been satisfied,
wherein sending the received trigger communication message to the destination device comprises:
sending the received trigger communication message to the destination device when it is determined that the criterion has been satisfied.

9. The method of claim 8, wherein:
determining the criterion for sending the trigger communication message to the destination device comprises scheduling the trigger communication message for transmission at a future time; and
monitoring conditions to determine whether the determined criterion has been satisfied comprises determining whether a current time is equal to the future time at which the trigger communication message is scheduled for transmission.

10. The method of claim 1, further comprising:
determining whether the trigger communication message includes a pseudonym identity value;
using the pseudonym identity value included in the trigger communication message to retrieve a hardware-based identity value from memory when it is determined that the trigger communication message includes a pseudonym identity; and
updating the trigger communication message by replacing the pseudonym identity value with the retrieved hardware-based identity value,
wherein sending the received trigger communication message to the destination device comprises sending the updated trigger communication message to the destination device.

11. The method of claim 1, further comprising:
receiving a response communication message that includes a hardware-based identity value from the destination device in response to sending the trigger communication message to the destination device;
determining whether a pseudonym identity should be used for the received response communication message;
generating a pseudonym identity value when it is determined that a pseudonym identity should be used for the response communication message;
storing the generated pseudonym identity value in memory in association with the hardware-based identity value included the response communication message;
updating the response communication message by replacing the hardware-based identity value with the generated pseudonym identity value; and
sending the response communication message to the source device.

12. A server computing device comprising:
a processor configured with processor-executable instructions to perform operations comprising:
receiving a trigger communication message from a source device, the trigger communication message including information suitable for causing a destination device to automatically establish a connection to the source device to communicate application level information;
receiving policy information from a component in a telecommunication network;
using the received policy information to determine whether the destination device should automatically establish the connection to the source device to communicate the application level information;
sending the received trigger communication message to the destination device in response to determining in the server computing device, based on the received policy information, that the destination device should automatically establish the connection to the source device to communicate the application level information.

13. The server computing device of claim 12, wherein the processor is configured with processor-executable instructions to perform operations such that receiving the policy information from the component in the telecommunication network further comprises:
receiving charging information via a charging based interface.

14. The server computing device of claim 12, wherein the processor is configured with processor-executable instructions to perform operations such that receiving the policy information from the component in the telecommunication network comprises:
receiving the policy information from a policy control rules function (PCRF) component via a policy based interface.

15. The server computing device of claim 12, wherein the processor is configured with processor-executable instructions to perform operations such that receiving the policy information from the component in the telecommunication network comprises receiving network congestion information.

16. A non-transitory computer readable storage medium having stored thereon processor-executable software instructions configured to cause a processor to perform operations comprising:
receiving a trigger communication message from a source device, the trigger communication message including information suitable for causing a destination device to automatically establish a connection to the source device to communicate application level information;
receiving the policy information from a component in a telecommunication network;
using the received policy information to determine whether the destination device should automatically establish the connection to the source device to communicate the application level information;
sending the received trigger communication message to the destination device in response to determining in the server computing device, based on the received policy information, that the destination device should automatically establish the connection to the source device to communicate the application level information.

17. The non-transitory computer readable storage medium of claim 16, wherein the stored processor-executable software instructions are configured to cause a processor to perform operations such that receiving the policy information from the component in the telecommunication network further comprises:
receiving charging information via a charging based interface.

18. The non-transitory computer readable storage medium of claim 16, wherein the stored processor-executable software instructions are configured to cause a processor to perform operations such that receiving the policy information from the component in the telecommunication network comprises:
receiving the policy information from a policy control rules function (PCRF) component.

19. The non-transitory computer readable storage medium of claim 16, wherein the stored processor-executable software instructions are configured to cause a processor to perform operations such that receiving the policy information from the component in the telecommunication network comprises receiving network congestion information.

* * * * *